(12) United States Patent
Wang et al.

(10) Patent No.: US 8,995,574 B2
(45) Date of Patent: Mar. 31, 2015

(54) METHOD FOR TRANSMITTING SIGNALS IN MULTI-CARRIER RADIO TRANSMISSION SYSTEM

(75) Inventors: Hai Wang, Beijing (CN); Lei Zhou, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 177 days.

(21) Appl. No.: 13/126,950

(22) PCT Filed: Oct. 30, 2009

(86) PCT No.: PCT/KR2009/006342
§ 371 (c)(1),
(2), (4) Date: Apr. 29, 2011

(87) PCT Pub. No.: WO2010/050774
PCT Pub. Date: May 6, 2010

(65) Prior Publication Data
US 2011/0211655 A1    Sep. 1, 2011

(30) Foreign Application Priority Data

Oct. 31, 2008 (CN) .......................... 2008 1 0175943

(51) Int. Cl.
*H04L 27/00* (2006.01)
*H04L 5/00* (2006.01)
(Continued)

(52) U.S. Cl.
CPC .......... *H04L 5/0023* (2013.01); *H04L 27/2611* (2013.01); *H04L 5/0048* (2013.01);
(Continued)

(58) Field of Classification Search
CPC ............ H04L 27/2611; H04L 27/2613; H04L 5/0048; H04B 7/0684

USPC ............ 375/295, 260, 267, 29; 370/208, 210
See application file for complete search history.

(56) References Cited

U.S. PATENT DOCUMENTS

| | | | |
|---|---|---|---|
| 8,174,957 B2* | 5/2012 | Ko et al. ........................ | 370/208 |
| 8,199,843 B2* | 6/2012 | Kwak et al. ................... | 375/267 |
| 2003/0081576 A1* | 5/2003 | Kim et al. ..................... | 370/335 |

(Continued)

FOREIGN PATENT DOCUMENTS

WO   2008-072899 A2   6/2008

OTHER PUBLICATIONS

Li et al. "Pilot allocations for 5-8 transmit antennas in optional FUD and Band AMC", Nov. 12, 2004, IEEE C802.16e-04/532r3, Intel, pp. 1-6.*

*Primary Examiner* — Sophia Vlahos
(74) *Attorney, Agent, or Firm* — Jefferson IP Law, LLP

(57) ABSTRACT

A method for transmitting signals in a multi-carrier radio transmission system is provided. The method includes a transmission block composed of N consecutive Orthogonal Frequency-Division Multiplexing (OFDM) symbols in a time domain and M consecutive physical sub-carriers in a frequency domain, where N and M are each an integer not less than 1. The method further includes encoding and interleaving data at a transmitting end, transmitting a pilot signal in a frequency area of a pilot stream for transmission of the pilot signal, performing, at the transmitting end, an IFFT operation on the encoded and interleaved data and the pilot signal, and transmitting, at the transmitting end, the data and the pilot signal through at least one antenna after inserting a preamble signal, wherein at least one pilot stream exists at the transmitting end, and wherein at most one pilot signal is transmitted in a group of OFDM symbols.

11 Claims, 11 Drawing Sheets

(51) Int. Cl.
*H04L 27/26* (2006.01)
*H04L 25/02* (2006.01)

(52) U.S. Cl.
CPC ........ *H04L25/0204* (2013.01); *H04L 25/0226* (2013.01); *H04L 25/0228* (2013.01); *H04L 27/2613* (2013.01)

USPC ............................. 375/299; 375/260; 375/267

(56) References Cited

U.S. PATENT DOCUMENTS

| | | | |
|---|---|---|---|
| 2005/0243939 A1 | 11/2005 | Jung et al. | |
| 2006/0291372 A1* | 12/2006 | Koo et al. | 370/208 |
| 2007/0253501 A1* | 11/2007 | Yamaura | 375/262 |
| 2008/0108310 A1* | 5/2008 | Tong et al. | 455/69 |
| 2008/0123547 A1* | 5/2008 | Palanki | 370/252 |

* cited by examiner

FIG.5

|   | PILOT STREAM 2 | | PILOT STREAM 8 | | | |
|---|---|---|---|---|---|---|
| PHYSICAL SUB-CARRIER 1 | 2 | 5 | 8 | 7 | 6 | 1 |
| PHYSICAL SUB-CARRIER 2 |   |   | 4 | 3 |   |   |
| PHYSICAL SUB-CARRIER 3 |   |   |   |   |   |   |
| PHYSICAL SUB-CARRIER 4 |   |   |   |   |   |   |
| ⋮ |   |   |   |   |   |   |
| PHYSICAL SUB-CARRIER 9 | 8 | 1 |   |   | 2 | 7 |
| PHYSICAL SUB-CARRIER 10 | 6 | 3 |   |   | 4 | 5 |
| ⋮ |   |   |   |   |   |   |
| PHYSICAL SUB-CARRIER 15 |   |   |   |   |   |   |
| PHYSICAL SUB-CARRIER 16 |   |   |   |   |   |   |
| PHYSICAL SUB-CARRIER 17 |   |   | 2 | 1 |   |   |
| PHYSICAL SUB-CARRIER 18 | 4 | 7 | 6 | 5 | 8 | 3 |

FIG.7

| | PILOT STREAM 2 | | | PILOT STREAM 8 | | |
|---|---|---|---|---|---|---|

| | | | | | | |
|---|---|---|---|---|---|---|
| PHYSICAL SUB-CARRIER 1 | 2 | 5 | 8 | 7 | 6 | 1 |
| PHYSICAL SUB-CARRIER 2 | | | 4 | 3 | | |
| PHYSICAL SUB-CARRIER 3 | | | | | | |
| PHYSICAL SUB-CARRIER 4 | | | | | | |
| ⋮ | | | | | | |
| PHYSICAL SUB-CARRIER 9 | 6 | 1 | | | 2 | 5 |
| PHYSICAL SUB-CARRIER 10 | 8 | 3 | | | 4 | 7 |
| ⋮ | | | | | | |
| PHYSICAL SUB-CARRIER 15 | | | | | | |
| PHYSICAL SUB-CARRIER 16 | | | | | | |
| PHYSICAL SUB-CARRIER 17 | | | | 2 | 1 | |
| PHYSICAL SUB-CARRIER 18 | 4 | 7 | 6 | 5 | 8 | 3 |

METHOD FOR TRANSMITTING SIGNALS IN MULTI-CARRIER RADIO TRANSMISSION SYSTEM

CROSS REFERENCE TO RELATED APPLICATIONS

This application is a National Stage application under 35 U.S.C. §371 of an International application filed on Oct. 30, 2009 and assigned application No. PCT/KR2009/006342, and claims the benefit under 35 U.S.C. §365(b) of a Chinese patent application filed Oct. 31, 2008 in the Chinese Intellectual Property Office and assigned application No. 200810175943.2, the entire disclosure of which is hereby incorporated by reference.

TECHNICAL FIELD

The present invention relates to a method for transmitting signals in a multi-carrier radio transmission system.

BACKGROUND ART

In the current multi-carrier radio transmission systems, e.g., a mobile WiMAX evolution system, its pilot pattern design is illustrated in FIG. 1. In FIG. 1, the abscissa is a time axis with each grid representing one OFDM symbol, and the ordinate is a frequency axis with each grid representing one physical sub-carrier. Three radio time-frequency transmission blocks with the same size are shown respectively in FIGS. 1(a), 1(b) and 1(c). Each radio time-frequency transmission block consists of 6 consecutive OFDM symbols and 18 consecutive physical sub-carriers. In such a multi-carrier system, a minimum unit of radio transmission resources is called a minimum time-frequency cell grid, which consists of one OFDM symbol and one physical sub-carrier. In each time-frequency transmission block of a transmission link of the multi-carrier system, a pilot signal is transmitted in several minimum time-frequency cell grids. With the leftmost time-frequency transmission block in FIG. 1 as an example, a certain antenna in a cell transmits the pilot signal via the minimum time-frequency cell grid labeled as "1" In a time-frequency transmission block shown in FIG. 1, this antenna transmits a total of 6 pilot signals, since 6 minimum time-frequency cell grids in total in the time-frequency transmission block are labeled as "1".

If there are multiple antennae in a cell, the minimum time-frequency cell grids occupied by the respective antennae usually are not overlapped in order to avoid interference. For instance, there are two antennae, i.e., the antenna 1 and the antenna 2, in a cell. As shown in FIG. 1, the pilot signal for the antenna 1, also called the pilot stream 1, is transmitted via the minimum time-frequency cell grid labeled as "1". The pilot signal for the antenna 2, also called the pilot stream 2, is transmitted via the minimum time-frequency cell grid labeled as "2". The pilot stream 1 and the pilot stream 2 are not overlapped either in a time domain or in a frequency domain. For a cell with more than two antennae, a similar method is employed to transmit its pilot streams.

If the multi-carrier radio transmission system is a cellular system, i.e., when a plurality of adjacent or overlapped cells need to transmit pilot signals, the minimum time-frequency cell grids occupied by these cells can be either overlapped or non-overlapped (i.e., no overlap between the respective pilot streams) in order to reduce interference. For instance, as shown in FIG. 1, each cell uses one pilot stream or two, which are called the pilot stream 1 and the pilot stream 2, respectively. Thus, the two antennae in the cell 1 use the 6 minimum time-frequency cell grids labeled as "1" and the 6 minimum time-frequency cell grids labeled as "2", respectively. Similarly, the two antennae in the cell 2 use the 6 minimum time-frequency cell grids labeled as "3" and the 6 minimum time-frequency cell grids labeled as "4" respectively. Also, the two antennae in the cell 3 use the 6 minimum time-frequency cell grids labeled as "5" and the 6 minimum time-frequency cell grids labeled as "6", respectively. Therefore, the 6 pilot streams altogether in the 3 cells of FIG. 1 do not overlap with each other. For the cell with more than two antennae, a similar method is employed to transmit its pilot streams. For the cell with one antenna, it will use only the pilot stream 1 or the pilot stream 2.

In the existing methods for transmitting pilot signals, no desirable transmission solution is available for a cell with more antennae. As shown in FIG. 1, if a cell uses not more than 6 antennae, the solution illustrated in FIG. 1 can be employed for transmission. However, if a cell uses more than 6 antennae, a position of the minimum time-frequency transmission block for transmitting pilot signals can not be determined by such a design. In addition, the existing methods for transmitting pilot signals are directed to the radio time-frequency transmission block composed of 6 consecutive OFDM symbols and 18 consecutive physical sub-carriers. If more than 6 antennae are used, one of problems to be solved is how to guarantee balance among the pilot streams for the respective antennae because the radio time-frequency transmission block is composed of 6 consecutive OFDM symbols. Particularly, if more than 6 antennae are used in a cell, tradeoff between the number of pilot signals and the system throughput should further be taken into account.

DISCLOSURE OF INVENTION

Technical Problem

Moreover, in the existing methods for transmitting pilot signals, on each antenna in each radio time-frequency transmission block, 6 pilot signals are transmitted. Their pilot pattern design has obvious asymmetry both in a time domain and in a frequency domain. Particularly at the edge of the time-frequency transmission block, many extrapolation algorithms have to be applied in channel estimation. This goes against accuracy of the channel estimation. Therefore, it is necessary to improve its pilot design solution even if not more than 6 antennae are used in a cell.

Furthermore, within a radio time-frequency transmission block, many differences exist in the pilot patterns for the different antennae in the existing solution which results in a necessity to design many channel estimation algorithms. This will increase complexity of channel estimation at a receiving end.

Solution to Problem

It is an object of the present invention to provide a method for transmitting signals in a multi-carrier radio transmission system.

To achieve the above object, in a method for transmitting signals in a multi-carrier radio transmission system, a transmission block is composed of N consecutive OFDM symbols in a time domain and M consecutive physical sub-carriers in a frequency domain, where N is an integer and not less than 1, and M is an integer and not less than 1, the method comprises steps of:

A transmitting end encodes and interleaves data;

At least one pilot stream exists at the transmitting end. In a pilot stream, only one pilot signal is transmitted in each frequency area for transmission of the pilot signal, and at most one pilot signal is transmitted in each group of OFDM symbols;

The transmitting end performs IFFT operation on the encoded and interleaved data and the pilot signal;

The transmitting end transmits out the data and the pilot signal-through antennae after inserting a preamble signal.

The present invention solves the problem of pilot transmission in the case of simultaneous transmission by multiple antennae, particularly more than 6 antennae. Much optimization design has been made with regard to reducing a non-uniform distribution in pilot signal transmission, avoiding asymmetry, reducing and eliminating imbalance between the respective antennae, reducing use of extrapolation algorithms and the like. The pilot pattern designed according to this method can significantly improve accuracy of channel estimation, reduce resources occupied by the pilot signals, reduce differences among pilot patterns on the multiple antennae, and reduce complexity of the channel estimation at a receiving end, so as to enhance the system performance.

Advantageous Effects of Invention

The present invention solves the problem of pilot transmission in the case of simultaneous transmission by multiple antennae, reducing a non-uniform distribution in pilot signal transmission, avoiding asymmetry and reducing use of extrapolation algorithms. The pilot pattern according to the present invention can significantly improve accuracy of channel estimation, reduce resources occupied by the pilot signals, reduce differences among pilot patterns on the multiple antennae, and reduce complexity of the channel estimation at a receiving end, and thereby enhance the system performance.

BRIEF DESCRIPTION OF DRAWINGS

The above and other aspects, features and advantages of certain exemplary embodiments of the present invention will be more apparent from the following description when taken in conjunction with the accompanying drawings in which:

FIG. 5 is a schematic diagram illustrating numbering of pilot cell grids to be transmitted in a multi-carrier system;

FIG. 7 illustrates a first embodiment of the new method for pilot pattern design according to the present invention;

FIG. 9 illustrates a third embodiment of the new method for pilot pattern design according to the present invention;

FIG. 11 is another schematic diagram illustrating numbering of pilot cell grids to be transmitted in the multi-carrier system.

Throughout the drawings, the same drawing reference numerals will be understood to refer to the same elements, features and structures.

BEST MODE FOR CARRYING OUT THE INVENTION

Figure 1:
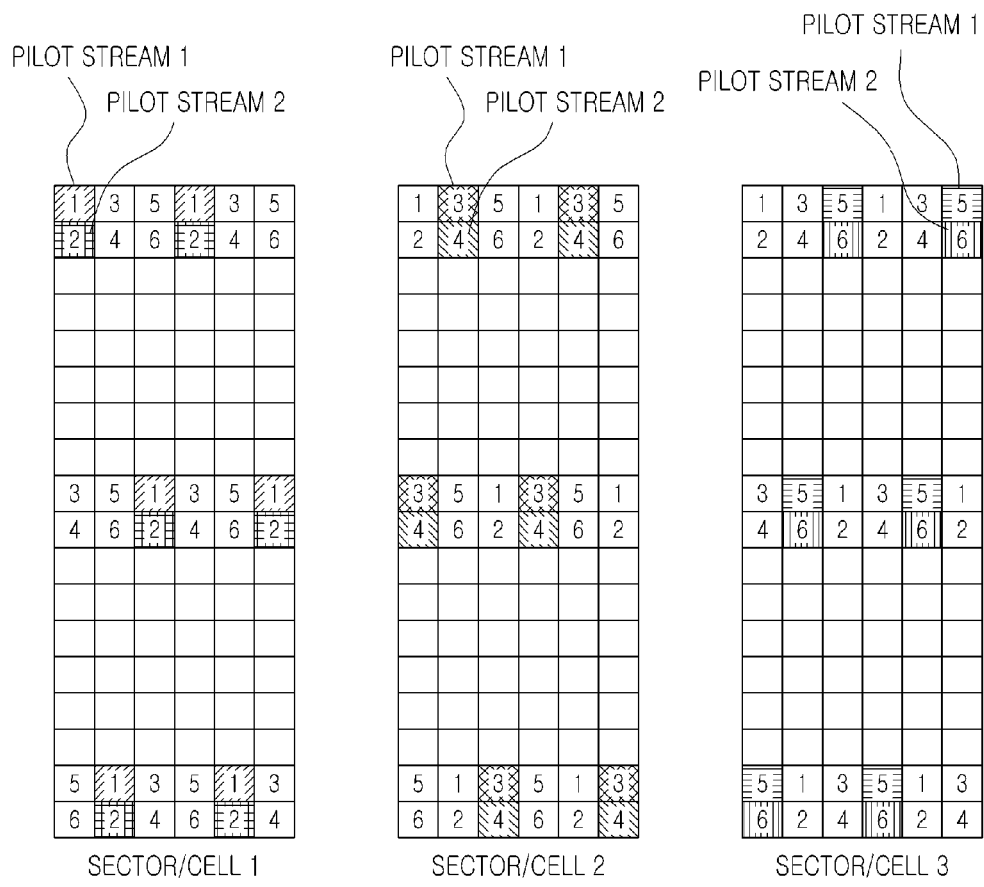
FIG. 1 is a diagram illustrating a conventional pilot pattern in a multi-carrier radio transmission system.
Figure 2:
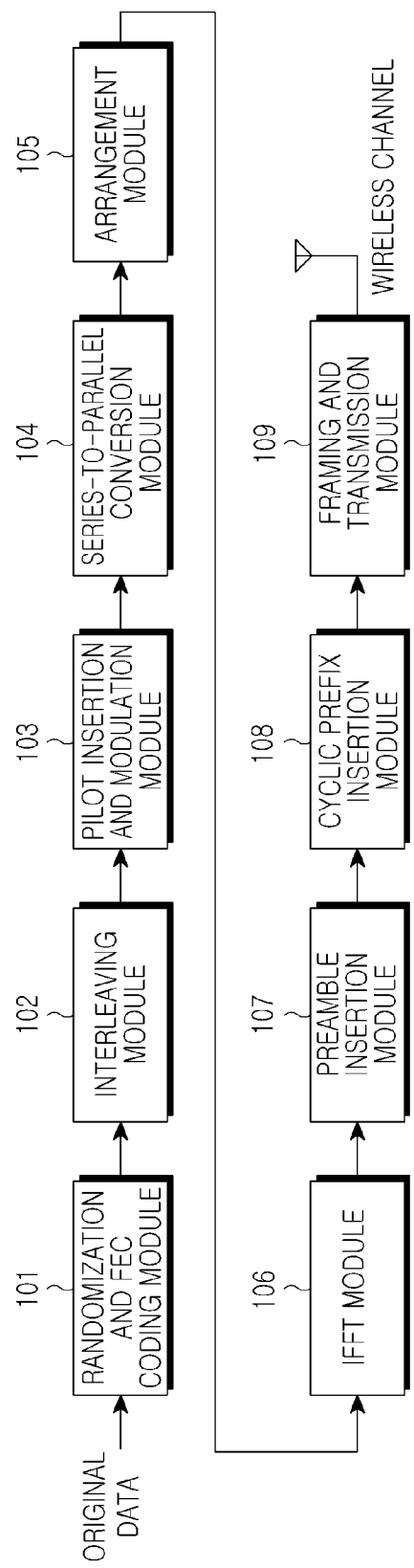
FIG. 2 is a schematic diagram illustrating a structure of a transmitting end in the multi-carrier radio transmission system.

The structure of the present invention consists of the following modules. A transmitting end is illustrated in FIG. 2.

101. A randomization and FEC coding module for performing randomization and FEC coding on original data;

102. an interleaving module for interleaving the FEC coded data;

103. a pilot insertion and modulation module for performing pilot insertion and modulation on the interleaved data. Firstly the pilot insertion is done by determining a position of a pilot stream and then inserting corresponding modulation signals therein so as to insert the pilot signal into a transmission block. The present invention focuses on this module.

104. A series to parallel conversion module for performing series to parallel conversion on the modulated data;

105. an arrangement module for arranging the series to parallel converted data;

106. an IFFT module for performing IFFT transformation on the arranged data;

107. a preamble insertion module for inserting preambles in front of the IFFT transformed data;

108. a cyclic prefix insertion module for inserting cyclic prefixes in front of all OFDM symbols obtained after the preamble insertion; and 109. a framing and transmission module for framing with OFDM symbols obtained after the cyclic prefix insertion and transmitting the frames.

Figure 3:
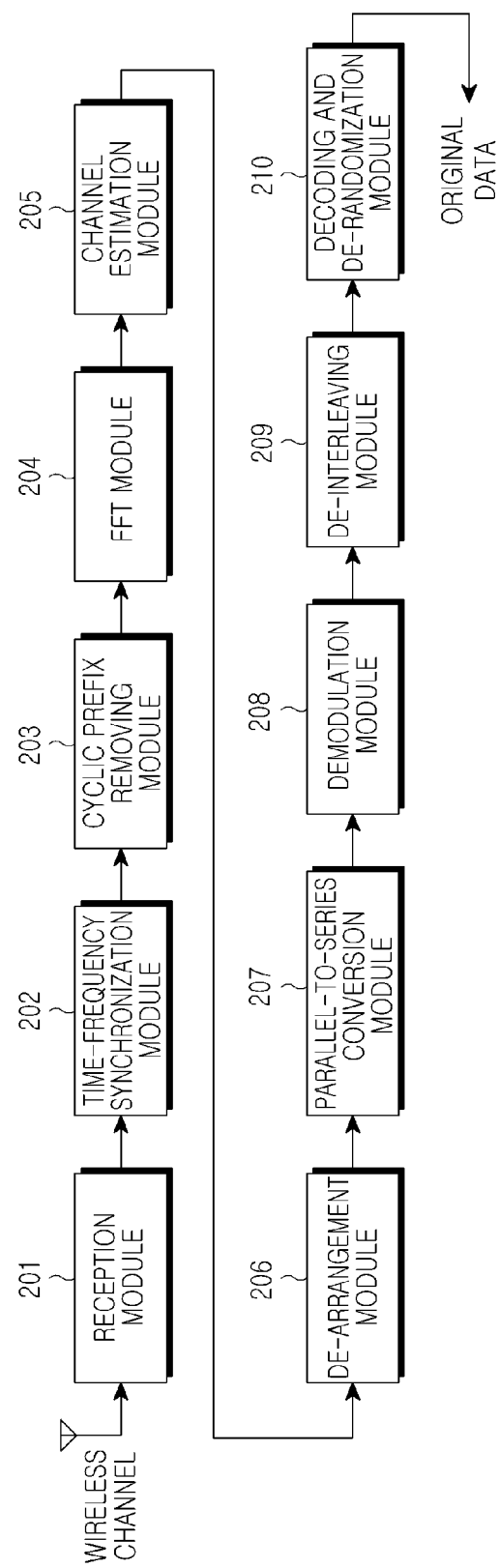
FIG. 3 is a schematic diagram illustrating a structure of a receiving end in the multi-carrier radio transmission system.

A receiving end is illustrated in FIG. 3.

201. A reception module for receiving the frames from the transmitting end;

202. a time-frequency synchronization module for extracting the preambles from the frames and performing time and frequency synchronization based on the preambles;

203. a cyclic prefix removing module for removing the cyclic prefixes from remaining OFMD symbols in the frames;

204. a FFT module for performing FFT transformation on the OFDM symbols from which cyclic prefixes are removed to obtain parallel data;

205. a channel estimation module for performing channel estimation based on the pilot inserted in the OFDM symbols;

206. a de-arrangement module for de-arranging the parallel data;

207. a parallel to series conversion module for performing parallel to series conversion on the de-arranged data to obtain serial data;

208. a demodulation module for demodulating the serial data;

209. a de-interleaving module for de-interleaving the demodulated data; and 210. a decoding and de-randomization module for decoding and de-randomizing the de-interleaved data to obtain the original data.

In the existing multi-carrier radio transmission system, the method for transmitting pilot signals has obvious asymmetry in a time-frequency domain, especially at the edge of the time-frequency transmission block. For instance, in a time-frequency transmission block illustrated in FIG. 4, the pilot stream 1 uses the $1^{st}$, $9^{th}$ and $17^{th}$ physical sub-carriers, and the pilot stream 2 uses the $2^{nd}$, $10^{th}$ and $18^{th}$ physical sub-carriers. By comparing the pilot stream 1 and the pilot stream 2, it can be found that the pilot stream 1 does not span the $18^{th}$ physical sub-carrier, and the pilot stream 2 does not span the $1^{st}$ physical sub-carrier. This asymmetry will directly result in that the pilot stream 1 has to use the extrapolation algorithm to perform channel estimation at the $18^{th}$ physical sub-carrier and the pilot stream 2 has to use the extrapolation algorithm to perform channel estimation at the $1^{st}$ physical sub-carrier. Obviously, this goes against accuracy of the channel estimation. In addition, the existing method for transmitting pilot signals is directed to the radio time-frequency transmission block composed of 6 consecutive OFDM symbols and 18 consecutive physical sub-carriers. If more than 6 antennae are used, one of problems to be solved is how to guarantee balance among the pilot streams for the respective antennae, because the radio time-frequency transmission block is composed of 6 consecutive OFDM symbols.

Furthermore, within a radio time-frequency transmission block, many differences exist in the pilot patterns for the different antennae in the existing solution, which results in a necessity to design many channel estimation algorithms. This will increase complexity of channel estimation at a receiving end.

For different multi-carrier radio transmission systems, it is possible that the radio time-frequency transmission blocks have different sizes. Without loss of generality, suppose a radio time-frequency transmission block is composed of N (N is an integer and not less than 1) consecutive OFDM symbols in the time domain and M (M is an integer and not less than 1) consecutive physical sub-carriers in the frequency domain. If a cell uses more than 6 antennae, tradeoff between the number of pilot signals and the system throughput should be taken into account. In the existing method for transmitting pilot signals, 6 pilot signals are transmitted on each antenna in each time-frequency transmission block, i.e., in 6 consecutive OFDM symbols, 6 pilot signals are transmitted in each pilot stream and the pilot streams do not overlap with each other. The fact that the pilot streams do no overlap with each other is also expressed as that the pilot streams are orthogonal. This design is not advantageous in the case of many antennae because it occupies too many radio transmission resources. Therefore, in the case of many antennae, a relatively desirable solution is to transmit about N/2 pilot signals on each antenna in each time-frequency transmission block.

Figure 5:
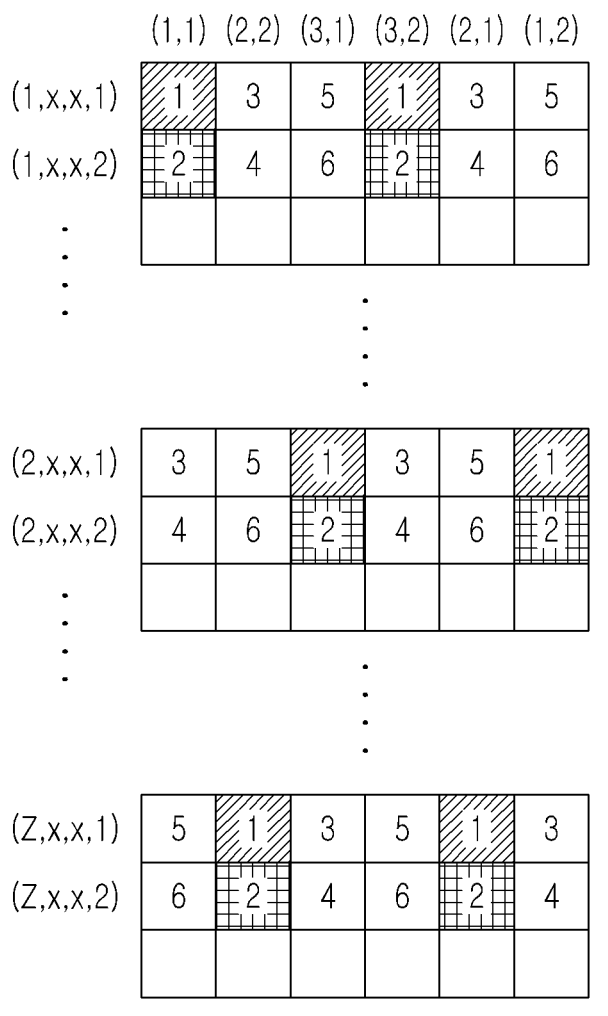
Figure 11:
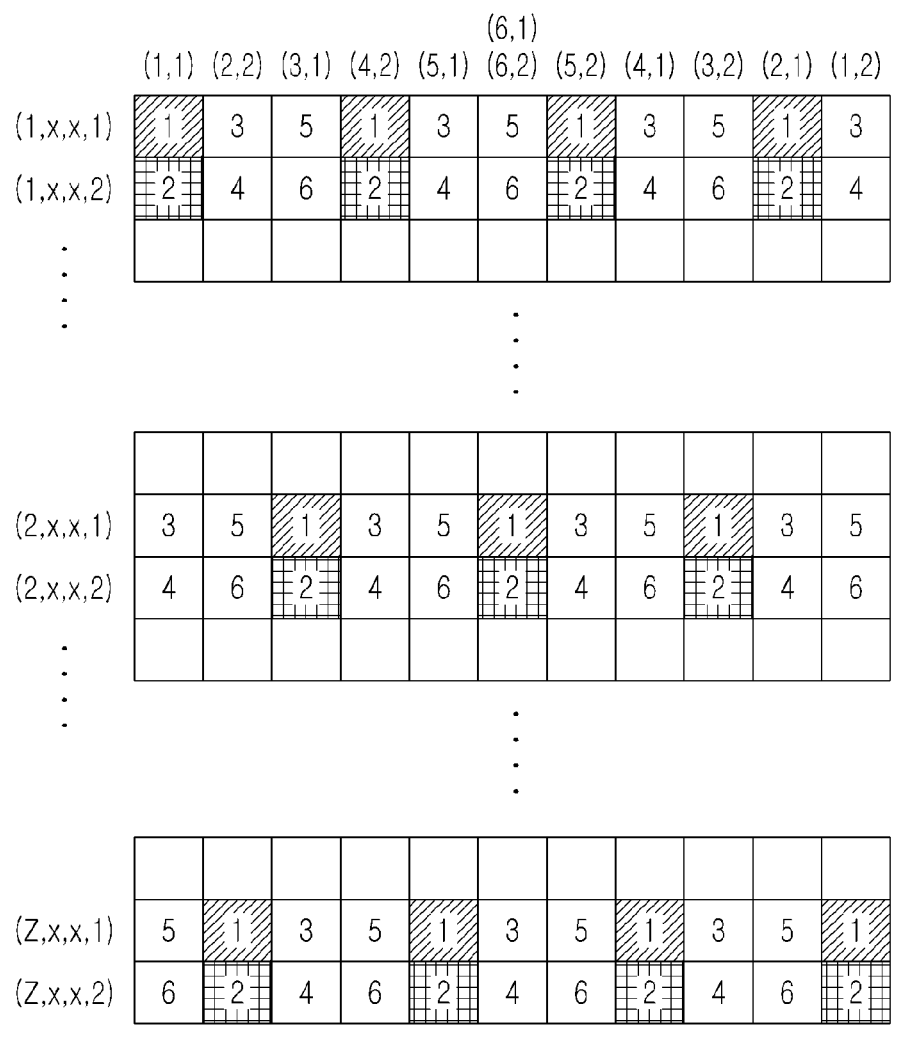

As shown in FIG. 5, without loss of generality, within this matrix with M rows and N columns, the minimum time-frequency cell grids which will transmit pilot signals will be numbered. Considering that from the perspective of the time domain and the frequency domain, the minimum time-frequency cell grids at the edge of the radio time-frequency transmission block provide better channel estimation and thus have a relatively high priority, they are numbered with small digits. Thus, the numbers in the time domain are in an ascending order from two sides to the center, and two OFDM symbols which are temporally symmetrical are grouped together, called a group of OFDM symbols and numbered with two digits such as (1,2). The first digit in the number is the same, e.g., (1,1) and (1,2) since two OFDM symbols in each group share the same priority in the time domain when the pilot signals are transmitted. Furthermore, the OFDM symbols in different groups have different time domain priorities. Therefore, in order to achieve balance between the respective antennae, at most one minimum time-frequency cell grid is selected from each group of OFDM symbols to transmit pilot signals when positions of the pilot signals are selected for a certain antenna with the present invention. That is to say, for the first digits in the above numbers, the corresponding digits of any two pilot signals are different in each designed pilot stream. To further distinguish the two OFDM symbols, the second digits in the numbers respectively take values of 1 and 2. Therefore, the less the first digit in the number is, the higher priority it has in the time domain, which is more suitable for transmitting pilot signals. The numbering for the second digit also complies with some rules. As shown in FIG. 5, without loss of generality, observing from left to right, when the first digit in the number is odd, the second digit in the number is in the ascending order, i.e., numbered from 1 to 2. For instance, the leftmost OFDM symbol is numbered as (1,1), and the rightmost OFDM symbol is numbered as (1,2). On the contrary, when the first digit in the number is even, the second digit in the number is in a descending order, i.e., from 2 to 1. For instance, the second leftmost OFDM symbol is numbered as (2,2), and the second rightmost OFDM symbol is numbered as (2,1). According to this rule, in the time domain, the numbering is performed from two sides to the center until the numbering of all OFDM symbols is completed. When the number of the OFDM symbols is odd in the time domain, the second digit in the numbering of an OFDM symbol just at the center can be either 1 or 2. It is also called a group of OFDM symbols. FIG. 5 shows an example of a time-frequency transmission block composed of 6 OFDM symbols. FIG. 11 shows an example of a time-frequency transmission block composed of 11 OFDM symbols. In FIG. 11, a group of OFDM symbols closest to the center is composed of one OFDM symbol which can be numbered as (6,1) or (6,2).

In addition, these groups of OFDM symbol in the time domain can be described from two sides to the center as following: a group of OFDM symbols closest to either side, a group of OFDM symbols second closest to either side, a group of OFDM symbols third closest to either side, ..., a group of OFDM symbols third closest to the center, a group of OFDM symbols second closest to the center, and a group of OFDM symbols closest to the center. Suppose that there are K groups of OFDM symbols in all, where K is an integer and K≥1. The above description can thus be: a group of OFDM symbols closest or first closest to either side, a group of OFDM symbols second closest to either side, a group of OFDM symbols third closest to either side, ..., a group of OFDM symbols $(K-2)^{th}$ closest to either side, a group of OFDM symbols $(K-1)^{th}$ closest to either side, and a group of OFDM symbols $K^{th}$ closest to either side. Likewise, the above description can be: a group of OFDM symbols $K^{th}$ closest to the center, a group of OFDM symbols $(K-1)^{th}$ closest to the center, a group of OFDM symbols $(K-2)^{th}$ closest to the center, ..., a group of OFDM symbols third closest to the center, a group of OFDM symbols second closest to the center, and a group of OFDM symbols closest or first closest to the center. That is to say, without loss of generality, as far as N (N is an integer and not less than 1) consecutive OFDM symbols in the time domain of a radio time-frequency transmission block are concerned, a group of OFDM symbols closest to either side is both a group of OFDM symbol first closest to either side and a group of OFDM symbols $K^{th}$ closest to the center, where K= $\lfloor (N+1)/2 \rfloor$,
which means a maximum integer not more than (N+1)/2.

Figure 4:
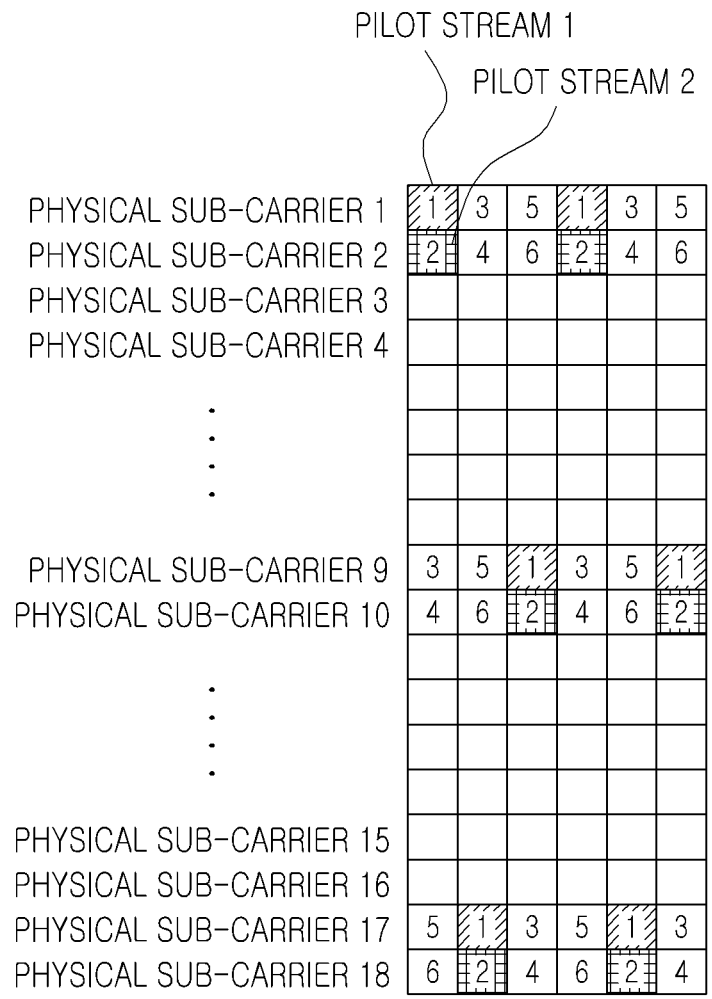
FIG. 4 is one of diagrams illustrating conventional pilot patterns in the multi-carrier radio transmission system.

The numbering in the frequency domain is also expressed by two digits such as (1,x,x,2), where '1' is the first digit and '2' is the second digit. Firstly, each of several groups of sub-carriers for transmitting pilot signals in the frequency domain is called a frequency area for transmission of pilot signals. As shown in FIG. 4, observing from top to bottom, the first group of sub-carriers for transmitting pilot signals, i.e., the first frequency area for transmission of pilot signals is composed of the physical sub-carrier 1 and the physical sub-carrier 2; the second group of sub-carriers for transmitting pilot signals, i.e., the second frequency area for transmission of pilot signals is composed of the physical sub-carrier 9 and the physical sub-carrier 10; and the third group of sub-carriers for transmitting pilot signals, i.e., the third frequency area for transmission of pilot signals is composed of the physical sub-carrier 17 and the physical sub-carrier 18. Usually, a frequency area for transmission of pilot signals is composed of one to several consecutive or mutually close physical sub-carriers. Therefore, the first digit is a number counted from top to bottom representing which frequency area for transmission of pilot signals in a certain pilot stream in frequency domain. The second digit of the numbering in the frequency domain, i.e., the last digit in the above "(1,x,x,2)" is a number counted from top to bottom representing which row of this frequency area for transmission of pilot signals. The spacing in the frequency domain between different frequency areas for transmission of pilot signals varies with the system. This does not affect the design method according to the present invention. In general, the spaces in the frequency domain between a plurality of frequency areas for transmission of pilot signals are close to each other, and the first and the last frequency areas for transmission of pilot signals are located at or close to the frequency domain edge of the radio time-frequency transmission block.

Consequently, in the present invention, four digits are necessary to position a pilot signal. They are defined as (n,an,bn,cn), where 'n' and 'cn' correspond to the aforementioned numbering in the frequency domain, and 'an' and 'bn' correspond to the aforementioned numbering in the time domain. For instance, as shown in FIG. 5, positions of 6 pilot signals labeled as "1" are, from top to bottom in the frequency domain and from left to right in the time domain, respectively numbered as (1,1,1,1), (1,3,2,1), (2,3,1,1), (2,1,2,1), (Z,2,2,1) and (Z,2,1,1). Here, Z is an integer representing the total number of frequency areas for transmission of pilot signals in a time-frequency transmission block. In the present invention, Z is about N/2.

Figure 6:
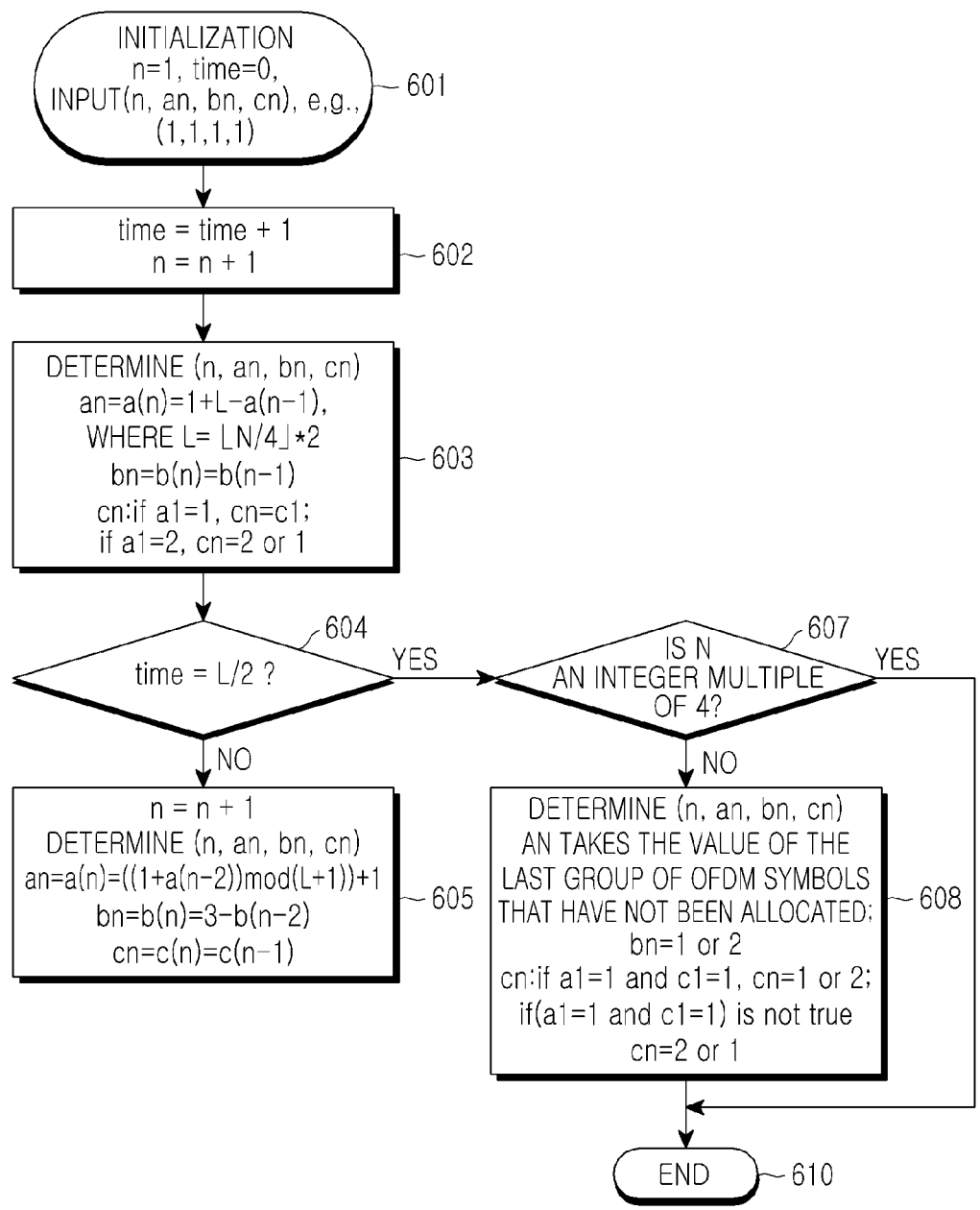
FIG. 6 illustrates a new method for pilot pattern design in the multi-carrier system.

A new method for pilot pattern design according to the present invention is as follows. As shown in FIG. 6, initialization is first performed to choose a set of initial values, e.g., (n, an, bn, cn). An initial value is composed of 4 digits, and the value of each digit refers to the previous description of each value. Without loss of generality, the initial value can be usually substituted into one of several minimum time-frequency cell grids at the top left corner of the first frequency area for transmission of pilot signals or of the time-frequency transmission block, such as (1,1,1,1), (1,2,2,1), (1,3,1,1), (1,1,1,2), (1,2,2,2), etc. With the method FA according to the present invention, as shown in FIG. 6, a signal design scheme for a pilot stream can be obtained, which is denoted as scheme A. According to the scheme A, a new pilot stream transmission scheme can be obtained with a mirror image operation in the radio time-frequency transmission block. In this way, by using three minor images, the three new pilot stream transmission schemes can be obtained. That is to say, a four-antenna pilot pattern design scheme is obtained. There are three types of minor image operations, respectively called the time-domain minor image, the frequency-domain mirror image and the time-frequency-domain minor image. According to the scheme A, scheme Ax can be obtained with the time-domain mirror image in the radio time-frequency transmission block. Likewise, according to the scheme A, scheme Ay can be obtained with the frequency-domain mirror image.

Similarly, according to the scheme A, scheme Axy can be obtained with the time-frequency-domain mirror image. It is to be noted that the scheme Axy usually differs from both the scheme Ax and the scheme Ay. Instead, the scheme Axy is usually the time-domain mirror image of the scheme Ay, or the frequency-domain mirror image of the scheme Ax. Performing the mirror image operation on the scheme A is actually by means of performing the same mirror image operation on each pilot signal in the scheme A. That is to say, by performing the mirror image operation on each pilot signal, the same number of mirror image positions are obtained. These positions compose a new pilot stream. The time-domain mirror image operation is to find a position symmetrical with respect to a time-domain central axis of a radio time-frequency transmission block. Likewise, the frequency-domain mirror image operation is to find a position symmetrical with respect to a frequency-domain central axis of the frequency areas for transmission of pilot signals in a radio time-frequency transmission block. Moreover, the time-frequency-domain mirror image operation is to find a position symmetrical with respect to a point where a time-domain central axis intersects with a frequency-domain central axis of the frequency areas for transmission of pilot signals in in a radio time-frequency transmission block. With FIG. 5 as an example, the time-domain minor image of a pilot signal (1,2,2,1) is (1,2,1,1), the frequency-domain minor image thereof is (Z,2,2,2), and the time-frequency-domain mirror image thereof is (Z,2,1,2).

The pilot design method FA according to the present invention is shown in FIG. 6. In the method FA, 'an' and 'a(n)' denote the same value. Likewise, bn and b(n) denote the same value, and cn and c(n) denote the same value. Firstly, as shown in FIG. 5, suppose a time-frequency transmission block is composed of N (N is an integer and not less than 1) consecutive OFDM symbols and M (M is an integer and not less than 1) consecutive physical sub-carriers. The time areas and the frequency areas of pilot signals to be transmitted in the time-frequency transmission block are numbered so that each minimum time-frequency cell grid corresponds to an unique number. The number is composed of 4 digits.

Then, the following steps are performed.

601) Initialization: let n=1, time=0, input (n, an, bn, cn). The initial value is usually positioned at one of several minimum time-frequency cell grids near the top left of the first frequency area for transmission of pilot signals or of the time-frequency transmission block, such as one of (1,1,1,1), (1,2,2,1), (1,3,1,1), (1,1,1,2), (1,2,2,2), etc.

602) The value of time increments by 1 and n increments by 1;

603) an=1+L−a(n−1), where L is twice an integer and the integer is not more than N/4; and bn=b(n−1). If a1=1, cn=c1; and if a1=2, cn=2 or 1 (preferably 2, i.e., recommended as 2);

604) judge whether time=L/2. If so, the process turns to step 607; and if not, the process turns to step 605;

605) n increments by 1;
an=((1+a(n−2))mod(L+1))+1, where "mod" refers to the modular operation; bn=3−b(n−2); and cn=c(n−1). Turn to step 602;

607) judge whether N is an integer multiple of 4. If so, the process turns to step 610; otherwise, the process turns to step 608;

608) n increments by 1;

609) 'an' takes the value of the last group of OFDM symbols that have not been allocated; bn=1 or 2 (preferably 1, i.e., recommended as 1). If a1=1 and c1=1, cn=1 or 2 (preferably 1, i.e., recommended as 1); and if a1 and c1 are not both 1, cn=2 or 1 (preferably 2, i.e., recommended as 2);

610) The design for a pilot stream is completed.

According to the above pilot design method FA, the time-frequency cell grids where other pilot streams are located in the time-frequency transmission block are allocated so as to transmit the pilot signals.

The pilot stream generated with the above pilot design method FA has the following characteristics:

for this pilot stream, only one pilot signal is transmitted in each frequency area for transmission of pilot signals; and for this pilot stream, at most one pilot signal is transmitted in each group of OFDM symbols.

$\lfloor N/4 \rfloor \times 2$ groups of OFDM symbols, which are closest to either side, among K groups of OFDM symbols are sorted as follows: g(1) stands for a group of OFDM symbols first closest to either side, g(2) stands for a group of OFDM symbols $(\lfloor N/4 \rfloor \times 2)^{th}$ closest to either side, g(3) stands for a group of OFDM symbols second closest to either side, g(4) stands for a group of OFDM symbols $(\lfloor N/4 \rfloor \times 2-1)^{th}$ closest to either side, . . . , $g(\lfloor N/4 \rfloor \times 2-1)$ stands for a group of OFDM symbols $(\lfloor N/4 \rfloor)^{th}$ closest to either side, and $g(\lfloor N/4 \rfloor \times 2)$ stands for a group of OFDM symbols $(\lfloor N/4 \rfloor +1)^{th}$ closest to either side. Thus, a sequence G is obtained, i.e., g(1), g(2), . . . , $g(\lfloor N/4 \rfloor \times 2)$.

Here, g(1) is called the leftmost end of the sequence G, and $g(\lfloor N/4 \rfloor \times 2)$ is called the rightmost end of the sequence G. It can be seen that with the above pilot design method FA, cyclic selection is actually done based on the order of this sequence G in the time domain.

The cyclic selection refers to the following step: the selection is firstly based on increment by 1 of i in g(i); when i is greater than $\lfloor N/4 \rfloor \times 2$, i.e., beyond the rightmost end of the sequence G, the selection returns to the leftmost end of the sequence G, i.e., g(1) is selected through the cyclic selection; then, if it is necessary to continue the cyclic seletion, g(2), g(3), . . . , $g(\lfloor N/4 \rfloor \times 2)$ are selected in turn; and upon exceeding $g(\lfloor N/4 \rfloor \times 2)$, the cyclic selection is performed on g(1). Therefore, from top to bottom in the frequency domain, the pilot design method FA can be described by using mathematical expressions as follows: if this pilot stream transmits pilot signals in a group of OFDM symbols corresponding to g(i) in the first frequency area for transmission of pilot signals, the pilot stream transmits pilot signals in such locations as a group of OFDM symbols corresponding to $g(((i+1) \bmod (\lfloor N/4 \rfloor \times 2+1))+1)$ in the second frequency area for transmission of pilot signals, a group of OFDM symbols corresponding to $g(((i+2) \bmod (\lfloor N/4 \rfloor \times 2+1))+1)$ in the third frequency area for transmission of pilot signals, . . . , and a group of OFDM symbols corresponding to $g(((i+\lfloor N/4 \rfloor \times 2-1) \bmod (\lfloor N/4 \rfloor \times 2+1))1)$ in the $(\lfloor N/4 \rfloor \times 2)^{th}$ frequency area for transmission of pilot signals.

Then, with a pilot stream design scheme obtained by using the above pilot design method FA, three minor image operations are performed on this completed pilot stream to obtain three new pilot stream transmission schemes. By far, four symmetrical pilot stream design schemes are obtained altogether, which support simultaneous transmission of pilot signals through four antennae.

To obtain a pilot transmission scheme for more antennae, e.g., 8 antennae, a new set of initial values can be substituted in order to obtain, by using the method FA according to the present invention, a new design scheme A2 for pilot streams in addition to the obtained four-antenna pilot transmission scheme (which can be referred to as scheme 4A1). Three mirror image operations are performed on the design scheme A2 to obtain another four-antenna pilot transmission scheme, which can be referred to as 4A2. An eight-antenna pilot transmission scheme can be obtained by combination of the scheme 4A1 and the scheme 4A2. Similarly, pilot transmission schemes for more antennae such as a 12-antenna pilot transmission scheme, a 16-antenna pilot transmission scheme and the like can be obtained.

Similarly, the pilot pattern design method according to the present invention can be applied to a cell with more than 8 antennae or a cell with less than 8 antennae. Furthermore, the pilot pattern design method according to the present invention can be applied to the case that the number of the antennae is an integer multiple of 4, or to the case that the number of the antennae is not an integer multiple of 4. In fact, when less than 8 antennae operate simultaneously in a cell, the pilot pattern design method can be made based on the aforementioned method, or made based on the four-antenna or eight-antenna design method and the required number of antennae are then selected from the four or eight antennae. For instance, if it is necessary to simultaneously employ less than 8 antennae for transmission, assuming x (x<8), it can be designed based on the 8-antenna design method, and any x pilot streams can be selected from the pilot streams 1, 2, . . . , and 8. Actually, considering with regard to performance and complexity, firstly, a certain pilot stream and its three minor images should be selected, and then, other pilot streams should be selected. For instance, pilot streams 1, 2, 3 and 4 are firstly selected, and pilot streams 5, 6, 7 and so on are then selected; or pilot streams 5, 6, 7 and 8 are firstly selected, and pilot streams 1, 2, 3 and so on are then selected. Moreover, the pilot streams can be arbitrarily selected. For instance, if x=6, any three of the pilot streams 1, 2, 3 and 4 are selected, and then any three of the pilot streams 5, 6, 7 and 8 are selected. Furthermore, if x<4, e.g., x=3, any one or two of the pilot streams 1, 2, 3 and 4 can be selected, and then the remaining number (i.e., 2 or 1) of pilot streams are arbitrarily chosen from the pilot streams 5, 6, 7 and 8. In another aspect, if the number of the antennae is greater than 8, assuming x' (x'>8), the pilot streams can be designed firstly based on the design method for eight antennae, and the rest x'-8 pilot streams can be designed further.

Similarly, for any number of antennae, the design for multiple-antenna pilot signal transmission can be made based on the method for the case that the number of the antennae is an integer multiple of 4, and the pilot streams are then selected or added. In this way, still with the method according to the present invention, a good pilot signal design scheme can be obtained.

The First Embodiment

As shown in FIG. 7, suppose a radio time-frequency transmission block is composed of 6 consecutive OFDM symbols in the time domain and 18 consecutive physical sub-carriers in the frequency domain. The pilot design method FA according to the present invention is applied in this embodiment. Therefore, N=6, M=18, K=3 and L=2. Suppose Z=3.

First, as shown in FIG. 5, the time areas and the frequency areas of pilot signals to be transmitted in the time-frequency transmission block are numbered. The number is composed of 4 digits.

Then, the following steps are performed.

1) Initialization: let n=1, time=0, and input (n, an, bn, cn), e.g. firstly input (1,1,1,1), i.e., a1=b1=c1=1.

2) time=1, n=2.

3) a2=1+L−a(1), i.e., a2=2; b2=b(2−1), i.e., b2=1. If a1=1, cn=c1, i.e., cn=1. Therefore, (2, 2, 1, 1) is obtained.

4) Judge whether "time" is equal to L/2, i.e., 1. If so, the process turns to step 7.

7) Judge whether N is an integer multiple of 4. If not, the process turns to step 8.

8) n increments by 1, i.e., n=3.

9) a3 takes the value of the last group of OFDM symbols that have not been allocated, i.e. a3=3; bn=1 or 2 (preferably 1 here). If a1=1 and c1=1, cn=1 or 2 (preferably 1 here). Therefore, (3,3,1,1) is obtained.

10) The design for a pilot stream is completed, i.e., three pilot signals (1,1,1,1), (2,2,1,1) and (3,3,1,1) are obtained. In the present invention, it is called pilot stream P7_1. In FIG. 7, the pilot signals in the pilot stream P7_1 are labeled with digits '2'. i.e., pilot stream 2.

By using the minor image method mentioned above, the time-domain mirror image operation, the frequency-domain minor image operation and the time-frequency-domain minor image operation are performed on the pilot stream P7_1 so as to respectively obtain pilot stream 1, pilot stream 4 and pilot stream 3 as shown in FIG. 7. By far, four symmetrical pilot stream design schemes are obtained altogether, which support simultaneous transmission of pilot signals through four antennae.

Each pilot stream generated with the above pilot design method FA has the following characteristics:

for this pilot stream, only one pilot signal is transmitted in each frequency area for transmission of pilot signals;

for this pilot stream, at most one pilot signal is transmitted in each group of OFDM symbols.

To support more antennae, new pilot streams are designed based again on the above pilot design method FA.

1) Initialization: let n=1, time=0, and input (n, an, bn, cn) with different initial values. Here, input (1,2,2,1), i.e., a1=b1=2, c1=1.

2) time=1, n=2.

3) a2=1+L−a(1), i.e., a2=1; b2=b(2−1), i.e., b2=2. If a1=2, c2=2 or 1, preferably 2 here. Therefore, (2,1,2,2) is obtained.

4) Judge whether "time" is equal to L/2, i.e., 1. If so, the process turns to step 7.

7) Judge whether N is an integer multiple of 4. If not, the process turns to step 8.

8) n increments by 1, i.e., n=3.

9) a3 takes the value of the last group of OFDM symbols that have not been allocated, i.e., a3=3; bn=1 or 2, here it is 2. If a1 and c1 are not both 1, cn=2 or 1, preferably 2 here. Therefore, (3,3,2,2) is obtained.

10) The design for a pilot stream is completed, i.e., three pilot signals (1,2,2,1), (2,1,2,2) and (3,3,2,2) are obtained. In the present invention, it is called pilot stream P7_2. In FIG. 7, the pilot signals in the pilot stream P7_2 are labeled with digits '5', i.e., pilot stream 5.

By using the minor image method mentioned above, the time-domain mirror image operation, the frequency-domain minor image operation and the time-frequency-domain minor image operation are performed on the pilot stream P7_2 so as to respectively obtain pilot stream 6, pilot stream 7 and pilot stream 8 as shown in FIG. 7. By far, another four symmetrical pilot streams design schemes are obtained. Therefore, eight pilot stream design schemes are obtained altogether, which support simultaneous transmission of pilot signals through eight antennae.

At this time, if it is necessary to simultaneously employ less than 8 antennae for transmission, assuming x (x<8), any x pilot streams can be selected from the 8 pilot streams in FIG. 7, i.e., pilot streams 1, 2, . . . , and 8. Actually, considering with regard to performance and complexity, firstly, a certain pilot stream and its three minor images should be selected, and then, other pilot streams should be selected. For instance, pilot streams 1, 2, 3 and 4 are firstly selected, and pilot streams 5, 6, 7 and so on are then selected; or pilot streams 5, 6, 7 and 8 are firstly selected, and pilot streams 1, 2, 3 and so on are then selected. Moreover, the pilot streams can be arbitrarily selected. For instance, if x=6, any three of the pilot streams 1, 2, 3 and 4 are selected, and then any three of the pilot streams 5, 6, 7 and 8 are selected.

The Second Embodiment

Figure 8:
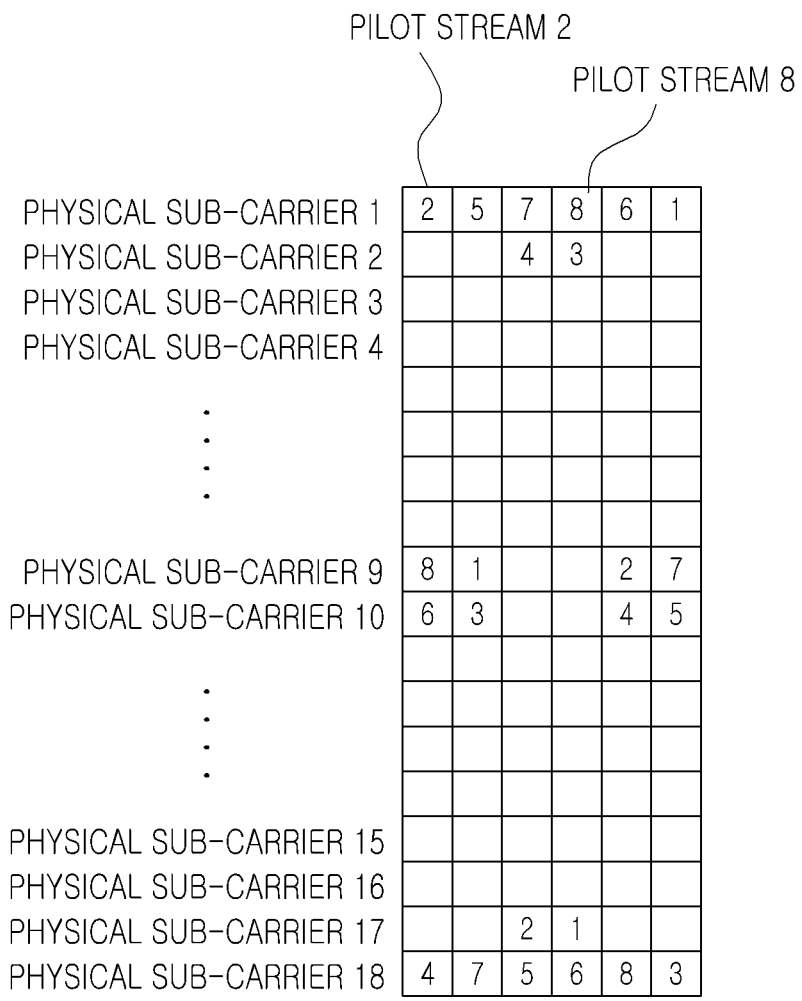
FIG. 8 illustrates a second embodiment of the new method for pilot pattern design according to the present invention.

As shown in FIG. 8, firstly, pilot stream P7_1, i.e., pilot stream 2 in FIG. 8, is obtained in a similar manner to that in the first embodiment. Then, new pilot streams are designed based on the aforementioned pilot design method FA.

1) Initialization: let n=1, time=0, and input (n, an, bn, cn) with different initial values. Here, input (1,2,2,1), i.e., a1=b1=2, c1=1.

2) time=1, n=2.

3) a2=1+L−a(1), i.e., a2=1; b2=b(2−1), i.e., b2=2. If a1=2, c2=2 or 1, preferably 2. Therefore, (2,1,2,2) is obtained.

4) Judge whether "time" is equal to L/2, i.e., 1. If so, the process turns to step 7.

7) Judge whether N is an integer multiple of 4. If not, the process turns to step 8.

8) n increments by 1, i.e., n=3.

9) a3 takes the value of the last group of OFDM symbols that have not been allocated, i.e., a3=3; bn=1 or 2, preferably 1 here. If a1 and c1 are not both 1, cn=2 or 1, preferably 2 here. Therefore, (3,3,1,2) is obtained.

10) The design for a pilot stream is completed, i.e., three pilot signals (1,2,2,1), (2,1,2,2) and (3,3,1,2) are obtained. In the present invention, it is called pilot stream P8_2. In FIG. 8, the pilot signals in the pilot stream P8_2 are labeled with digits '5', i.e., pilot stream 5.

Other design can be made with reference to the first embodiment.

The Third Embodiment

As shown in FIG. 9, firstly, pilot stream P7_1, i.e., pilot stream 2 in FIG. 9, is obtained in a similar manner to that in the first embodiment. Then, new pilot streams are designed based on the aforementioned pilot design method FA.

1) Initialization: let n=1, time=0, and input (n, an, bn, cn) with different initial values. Here, input (1,2,2,1), i.e., a1=b1=2, c1=1.

2) time=1, n=2.

3) a2=1+L−a(1), i.e., a2=1; b2=b(2-1), i.e., b2=2. If a1=2, c2=2 or 1, preferably 1 here. Therefore, (2, 1, 2, 1) is obtained.

4) Judge whether "time" is equal to L/2, i.e., 1. If so, the process turns to step 7.

7) Judge whether N is an integer multiple of 4. If not, the process turns to step 8.

8) n increments by 1, i.e., n=3.

9) a3 takes the value of the last group of OFDM symbols that have not been allocated, i.e., a3=3; bn=1 or 2, here it is 2. If a1 and c1 are not both 1, cn=2 or 1, preferably 2 here. Therefore, (3,3,2,2) is obtained.

10) The design for a pilot stream is completed, i.e., three pilot signals (1,2,2,1), (2,1,2,1) and (3,3,2,2) are obtained. In the present invention, it is called pilot stream P9_2. In FIG. 9, the pilot signals in the pilot stream P9_2 are labeled with digits '5', i.e., pilot stream 5.

Other design can be made with reference to the first embodiment.

The Fourth Embodiment

Figure 10:
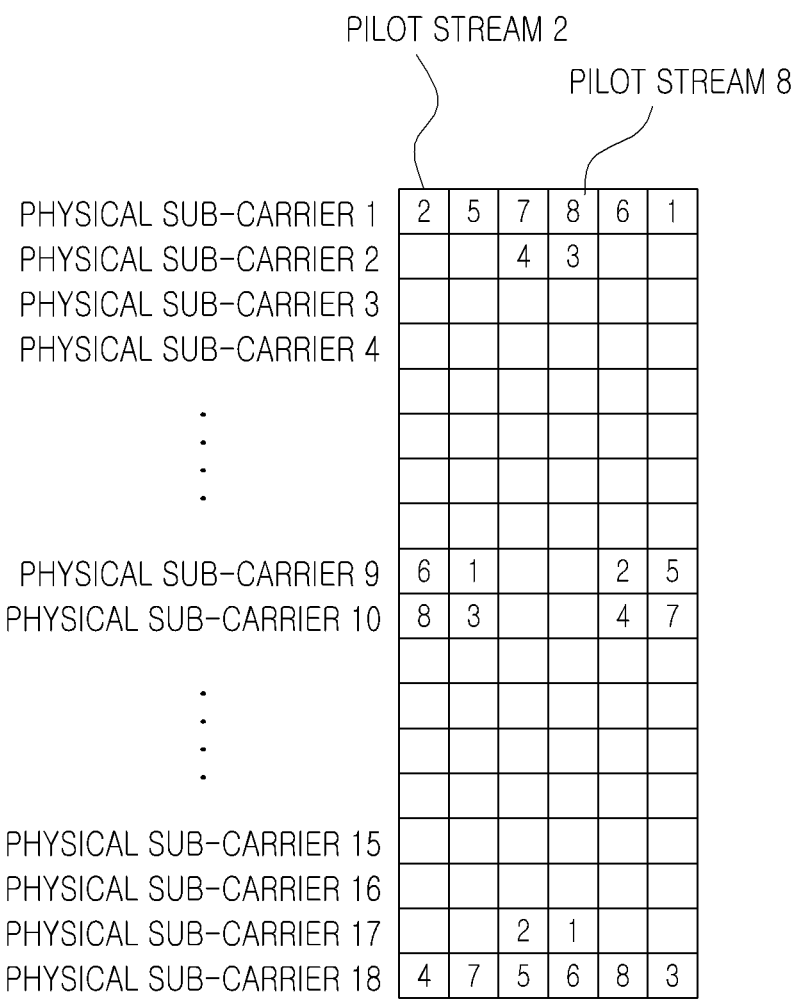
FIG. 10 illustrates a fourth embodiment of the new method for pilot pattern design according to the present invention.

As shown in FIG. 10, firstly, pilot stream P7_1, i.e., pilot stream 2 in FIG. 10, is obtained in a similar manner to that in the first embodiment. Then, new pilot streams are designed based on the aforementioned pilot design method FA.

1) Initialization: let n=1, time=0, and input (n, an, bn, cn) with different initial values. Here, input (1,2,2,1), i.e., a1=b1=2, c1=1.

2) time=1, n=2.

3) a2=1+L−a(1), i.e., a2=1; b2=b(2−1), i.e., b2=2. If a1=2, c2=2 or 1, It is 1 here. Therefore, (2, 1, 2, 1) is obtained.

4) Judge whether "time" is equal to L/2, i.e., 1. If so, the process turns to step 7.

7) Judge whether N is an integer multiple of 4. If not, the process turns to step 8.

8) n increments by 1, i.e., n=3.

9) a3 takes the value of the last group of OFDM symbols that have not been allocated, i.e., a3=3; bn=1 or 2, preferably 1 here. If a1 and c1 are not both 1, cn=2 or 1, preferably 2 here. Therefore, (3,3,1,2) is obtained.

10) The design for a pilot stream is completed, i.e., three pilot signals (1,2,2,1), (2,1,2,1) and (3,3,1,2) are obtained. In the present invention, it is called pilot stream P10_2. In FIG. 10, the pilot signals in the pilot stream P10_2 are labeled with digits '5', i.e., pilot stream 5. Other design can be made with reference to the first embodiment.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

The invention claimed is:

1. A method for transmitting signals of a transmitting end in a multi-carrier radio transmission system, the method comprising:

encoding and interleaving data;

inserting a pilot signal into the encoded and interleaved data;

performing an inverse fast fourier transform (IFFT) transformation on the pilot signal-inserted data; and transmitting the IFFT transformed data through at least one antenna, wherein pilot signals are transmitted via pilot streams in positions based on cyclic selection, which considers both of a time domain and a frequency area from a first group of orthogonal frequency division multiplexing (OFDM) symbols to a ($\lfloor N/4 \rfloor \times 2$)th group of OFDM symbols for transmission of the pilot signals, wherein a transmission block is composed of N consecutive OFDM symbols in a time domain and M consecutive physical sub-carriers in a frequency area, where each of N, M is a positive integer, and wherein $\lfloor N/4 \rfloor \times 2$ groups of OFDM symbols, which are closest on either side to OFDM symbols in the center of the time domain, among K groups of OFDM symbols are sorted based on the cyclic selection such that g(1) stands for a group of OFDM symbols first closest to either side, g(2) stands for a group of OFDM symbols ($\lfloor N/4 \rfloor \times 2$)th closest to either side, g(3) stands for a group of OFDM symbols second closest to either side, g(4) stands for a group of OFDM symbols ($\lfloor N/4 \rfloor \times 2 - 1$)th closest to either side, ..., g($\lfloor N/4 \rfloor \times 2 - 1$) stands for a group of OFDM symbols ($\lfloor N/4 \rfloor$)th closest to either side, and g($\lfloor N/4 \rfloor \times 2$) stands for a group of OFDM symbols ($\lfloor N/4 \rfloor + 1$)th closest to either side.

2. The method according to claim 1, wherein if the transmitting end transmits the pilot signals in a group of OFDM symbols corresponding to g(i) in a first frequency area for transmission of pilot signals, the transmitting end transmits the pilot signals in the following locations: a group of OFDM symbols corresponding to g(((i+1)mod($\lfloor N/4 \rfloor \times 2+1$))+1) in a second frequency area for transmission of the pilot signals, a group of OFDM symbols corresponding to g(((i+2)mod($\lfloor N/4 \rfloor \times 2+1$))+1) in a third frequency area for transmission of the pilot signals, ..., and a group of OFDM symbols corresponding to g(((i+$\lfloor N/4 \rfloor \times 2-1$)mod($\lfloor N/4 \rfloor \times 2+1$))+1) in ($\lfloor N/4 \rfloor \times 2$)th frequency area for transmission of the pilot signals, and wherein K is an integer and K≥1, and i is greater than $\lfloor N/4 \rfloor \times 2$.

3. The method according to claim 1, wherein the transmitting end comprises a plurality of antennae.

4. The method according to claim 3, wherein the pilot signals transmitted via one pilot stream for one antenna are a mirror image of the pilot signals transmitted via another pilot stream for another antenna.

5. The method according to claim 3, wherein the number of the antennae is 8.

6. The method according to claim 5, wherein pilot streams for 4 of the antennae and pilot streams for the other 4 antennae do not overlap, the pilot streams for the two sets of 4 antennae comply with a mirror image relationship.

7. The method according to claim 4, wherein the mirror image includes a time-domain mirror image, a frequency-domain mirror image or a time-frequency-domain mirror image.

8. The method according to claim 6, wherein the mirror image includes a time-domain mirror image, a frequency-domain mirror image or a time-frequency-domain mirror image.

9. A method for forming pilot signals in a multi-carrier radio transmission system, wherein a transmission block is composed of N consecutive orthogonal frequency-division multiplexing (OFDM) symbols in a time domain and M consecutive physical sub-carriers in a frequency area, where each of N and M is a positive integer, the method comprising:

1) selecting, by a pilot insertion and modulation module, a time-frequency cell grid (n,an,bn,cn) in the transmission block, where n=1 and time=0;

2) increasing a value of time by 1 and the value of 'n' by 1;

3) assigning to 'an' a value of 1+L−a(n−1), where L is twice as large as an integer that is not more than N/4 and bn=b(n−1), such that if a1=1, then cn=c1, and if a1=2, then cn=2 or 1;
4) determining whether time=L/2, and if so, proceeding to step 7, and if not, proceeding to step 5;
5) increasing 'n' by 1;
6) assigning to 'an' a value of ((1+a(n−2))mod(L+1))+1, wherein bn=3−b(n−2), and cn=c(n−1), then proceeding to step 2;
7) determining whether N is an integer multiple of 4, and if not, proceeding to step 8;
8) increasing 'n' by 1;
9) assigning to 'an' a value of a last group of OFDM symbols that have not been allocated, wherein bn=1 or 2, and if a1=1 and c1=1, then cn=1 or 2, and if a1 and c1 are not both 1, then cn=2 or 1; and
10) transmitting, with one or more antenna, the last group of OFDM symbols,
wherein the time-frequency cell grid includes four digits for positioning a pilot signal.

10. The method according to claim 9, wherein at least one mirror image operation is performed on a pilot stream to obtain more pilot streams.

11. The method according to claim 10, wherein the mirror image includes a time-domain mirror image, a frequency-domain mirror image or a time-frequency-domain mirror image.

* * * * *